United States Patent [19]

Dewey et al.

[11] Patent Number: 5,084,783
[45] Date of Patent: Jan. 28, 1992

[54] FOCUS-ERROR DETECTION USING PRISM-ENHANCED SPOT SIZE MONITORING

[75] Inventors: Anthony G. Dewey, San Jose; Wilfried Lenth, Santa Cruz; Daniel Rugar, Palo Alto, all of Calif.

[73] Assignee: International Business Machines Corporation, Armonk, N.Y.

[21] Appl. No.: 511,664

[22] Filed: Apr. 20, 1990

Related U.S. Application Data

[63] Continuation-in-part of Ser. No. 357,566, May 26, 1989, abandoned.

[51] Int. Cl.5 .......................... G02B 27/12; G02B 5/04; G11B 21/10
[52] U.S. Cl. ................................ 359/640; 359/618; 359/837; 369/44.14; 369/44.23
[58] Field of Search ................ 350/170-174, 350/370, 376, 378, 384, 401-405; 250/201, 202, 216; 369/44-46, 112

[56] References Cited

U.S. PATENT DOCUMENTS

| | | | |
|---|---|---|---|
| Re. 24,972 | 4/1961 | Luboshez | 350/424 |
| 4,358,200 | 11/1982 | Hgemskerk | 350/172 |
| 4,635,244 | 1/1987 | Gotoh | 350/402 |
| 4,689,780 | 8/1987 | Ohara et al. | 350/402 |
| 4,719,614 | 1/1988 | Leterme et al. | 369/110 |
| 4,725,725 | 2/1988 | Ando | 369/44.14 |
| 4,793,696 | 12/1988 | Suh | 350/370 |
| 4,888,752 | 12/1989 | Arai | 250/201.5 |
| 4,920,527 | 4/1990 | Maeda | 369/44.23 |
| 4,965,785 | 10/1990 | Tadokoro et al. | 369/112 |

FOREIGN PATENT DOCUMENTS

2107483  4/1983  United Kingdom ................ 350/170

OTHER PUBLICATIONS

"Design Consideration of Optical Pregroove Dimensions", Yamamoto et al, Optical Society of America, 1985, pp. 1-4.

Primary Examiner—Bruce Y. Arnold
Assistant Examiner—Thong Nguyen
Attorney, Agent, or Firm—Douglas R. Millett

[57] ABSTRACT

An apparatus and method is described for detecting focus errors in an optical head by positioning a prism in the optical path of a return light beam reflected from an optical recording medium. The prism reduces the beam in one dimension by a factor of M and concurrently increases the divergence/convergence angle associated with a focus-error of the beam by a factor of M in this dimension, thereby desirably enhancing the focus error signal by a factor of $M^2$. A focus error is detected by a segmented photodetector having inner and outer photosensitive regions. The photodetector generates an electrical signal indicative of the focus error from the difference in light intensities at the inner and outer regions. The photodetector preferably is segmented in such manner as to also provide a track error signal.

11 Claims, 3 Drawing Sheets

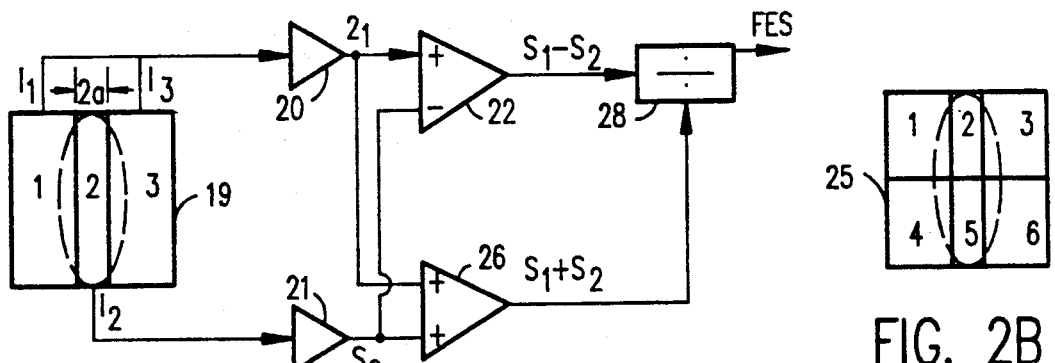
FIG. 2A
FIG. 2B
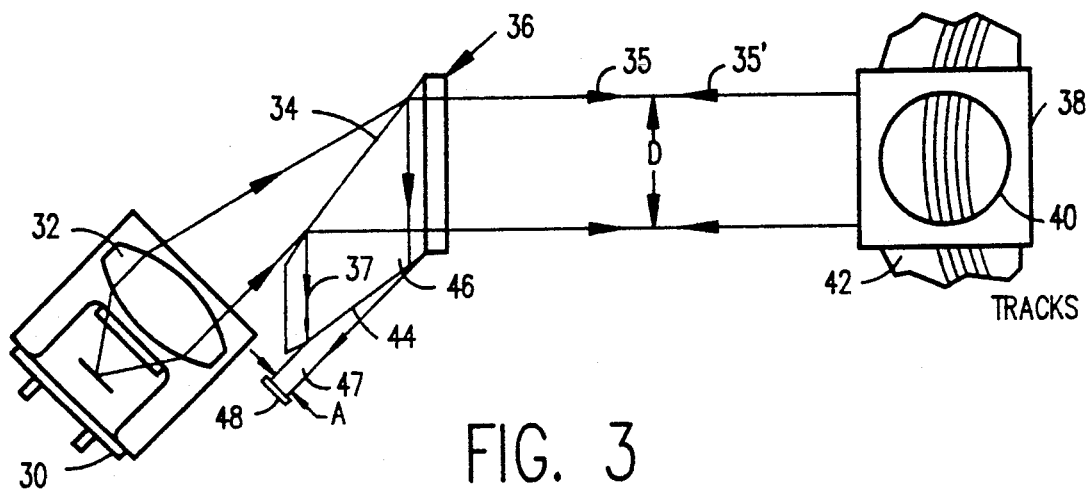
FIG. 3
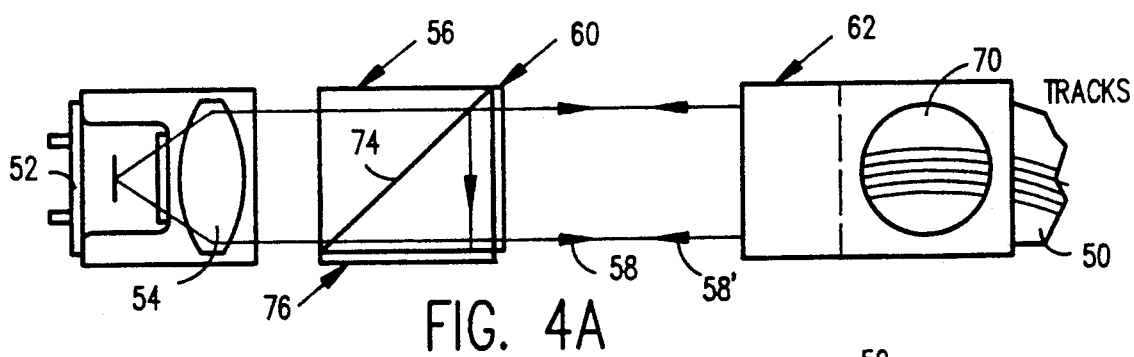
FIG. 4A
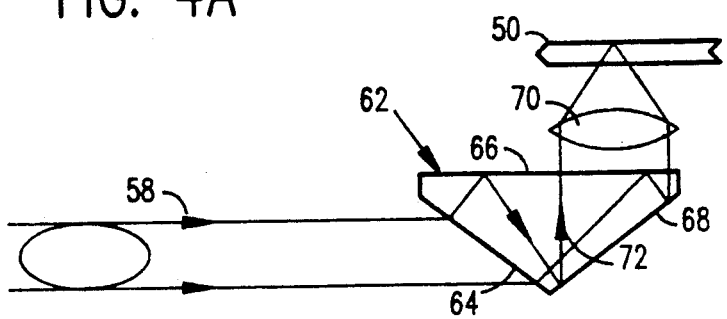
FIG. 4B ns to read and write data on optical recording media, and more particularly relates to improved means for generating a focus error signal for use as focus on a surface.

FOCUS-ERROR DETECTION USING PRISM-ENHANCED SPOT SIZE MONITORING

This is a Continuation-in-Part of application Ser. No. 07/357,566, filed May 26, 1989, now abandoned.

TECHNICAL FIELD

This invention relates to methods and means for detecting focus errors in optical heads adapted to read and write data on optical recording media, and more particularly relates to improved means for generating a focus error signal for use as focus on a surface.

BACKGROUND OF THE INVENTION

Focus-error detection methods heretofore used for optical storage applications generally employ a knife edge, an astigmatic lens or a critical angle prism. These techniques require very critical alignment of these optical elements and of a segmented photodetector.

Published European patent application EP 0164687 discloses a detection technique wherein a laser beam reflected from an optical disk is directed through an objective lens to a prism that reduces beam width in one dimension by a factor M and delivers an elliptical beam to a knife-edge-type focus error detection system. This application claims that the use of the prism increases the focus error signal by a factor of M compared to the standard knife edge technique without a prism.

The Digest of the Topical Meeting on Optical Data Storage, Oct. 15-17, 1985 at Washington, D.C., includes Paper THCC2-1 by Yamamoto et al. entitled "Design Consideration of Optical Pregroove Dimensions". This paper shows a six-element photodetector to detect the far field spot size variations associated with a focus error.

There is a need for a very sensitive focus-error detection technique that will provide, with relatively few components, a significant enhancement of the focus-error signal and provide a large beam size that only requires an uncritical alignment of a segmented photodetector in one dimension.

SUMMARY OF THE INVENTION

Toward this end and according to the invention, an apparatus and method are provided for detecting focus errors in an optical head by positioning a prism in the optical path of a return light beam reflected from an optical recording medium. The prism reduces the beam in one dimension by a factor of M and concurrently increases the divergence/convergence angle associated with a focus-error of the beam by a factor of M in said dimension, thereby desirably enhancing the focus error signal by a factor of $M^2$. A focus error is detected by a segmented photodetector having inner and outer photosensitive regions, such as shown in the Yamamoto et al. paper. The photodetector generates an electrical signal indicative of the focus error from the difference in light intensities at the inner and outer regions. The photodetector preferably is segmented in such manner as to also provide a track error signal.

BRIEF DESCRIPTION OF THE DRAWINGS

FIGS. 2A shows a schematic diagram of a segmented photodetector and associated circuit of the present invention;

FIG. 2B shows a schematic diagram of an alternative segmented photodetector of the present invention;

FIG. 3 illustrates an optical head according to one embodiment of the invention for use with read-only, write-once or phase-change optical disks;

FIG. 4A shows a tip view of an embodiment for use with an optical disk drive employing a swing arm actuator;

FIG. 4B shows a partial side view of the embodiment of FIG. 4A and;

DESCRIPTION OF PREFERRED EMBODIMENTS

General

Figure 1:
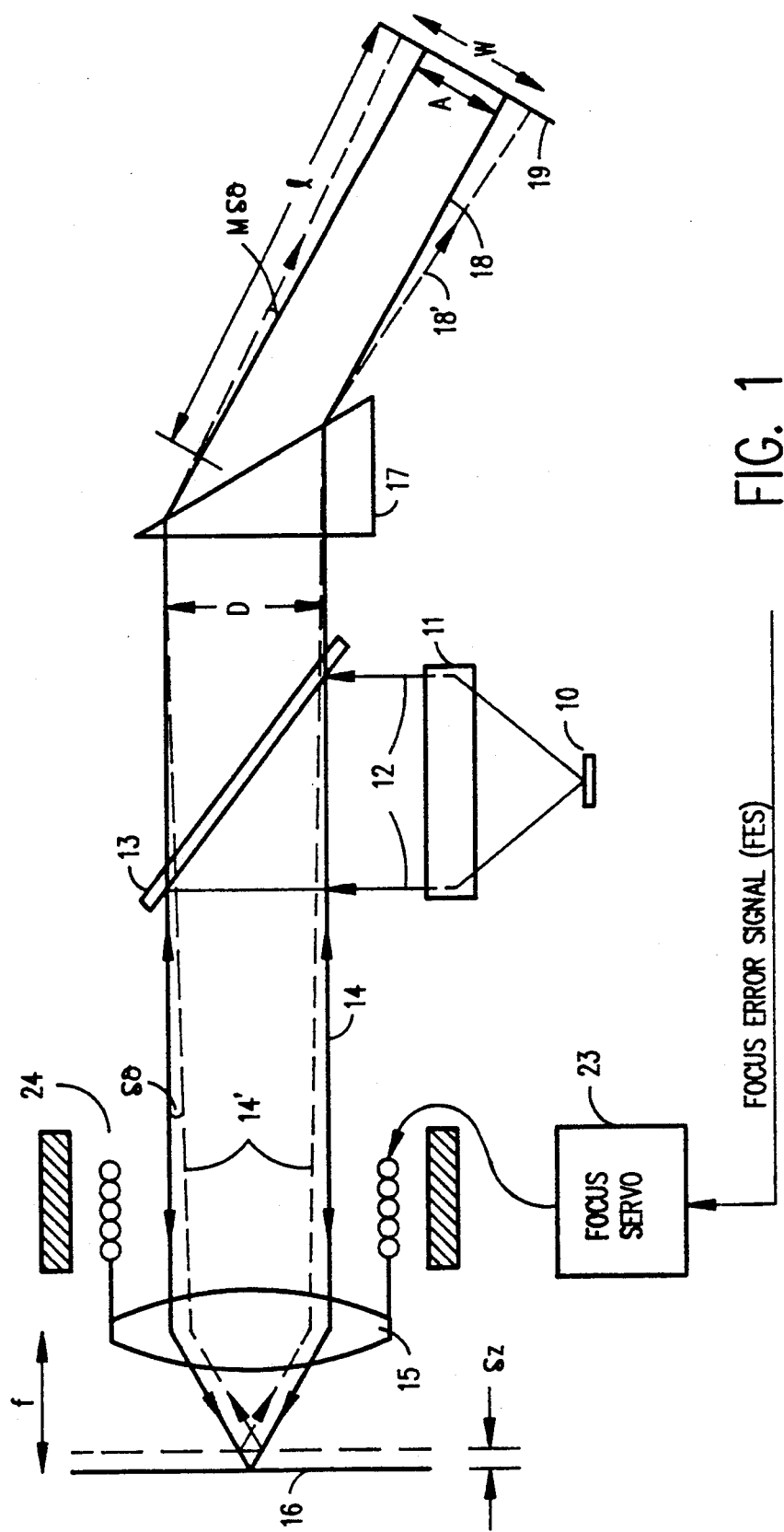
FIG. 1 is a schematic diagram that illustrates the principle of the invention.

The principle of the invention is best illustrated in FIG. 1. The output of a diode laser 10 is passed through a circularizer/collimator system 11 to provide a collimated beam 12. On reflection from a beam splitter 13, beam 12 becomes beam 14. Beam 14 is focused by a lens 15 onto surface 16 of an optical recording medium. When surface 16 is at the focus of lens 15, the collimated beam 14 from beam splitter 13 to lens 15 is retroreflected on itself and, as return beam 14, is transmitted by beam splitter 13 to a prism 17. Prism 17 refracts beam 14 as beam 18, which is directed without obstruction to a photodetector 19. The full cross-sectional beam pattern of beam 18 falls on photodetector 19. Beam 18 has an intensity pattern of elliptical configuration, with a major axis equal to D and a minor axis A. Prism 17 reduces the width of beam 14 by a factor of M (which is defined as M = D/A) to that of refracted beam 18.

Assume now that the surface 16 is displaced from the focus of lens 15 by an amount δz. Under this assumed condition, the beam 14' reflected from surface 16 will, after passing through lens 15, diverge with an angle δθ, in which $$\delta\theta = D\delta z/f^2 \tag{1}$$

where f is the focal length of lens 15.

If δz is negative, then δθ will be negative and the beam 14' will converge. The following analysis considers the case of δz being positive, but when δz is small, the same analysis is valid for a diverging or converging beam 14'.

The refracted beam 18' emerging from prism 17 has a divergence angle of Mδθ; and the width W of said beam on detector 19 is now given by $$W \approx A + 2lM\delta\theta \tag{2}$$

where l is the distance from prism 17 to photodetector 19.

Using equation (1), one obtains $$W = A + 2lMD\delta z/f^2$$
$$= A + 2lM^2 A\delta z/f^2$$

or $$\delta W/\delta z = (W-A)/\delta z = 2lM^2 A/f^2 \tag{3}$$

It will thus be seen that, by inserting prism 17 in the path of the return beam 14' from surface 16, the change in beam width δW indicative of a focus error δz is enhanced by a factor $M^2$. M is determined by the apex angle of prism 17, and by the refractive index of the material from which it is made. M may be made arbitrarily large; however, the tolerance on alignment of the system becomes increasingly tight as M increases. A practical maximum value of M for a single prism 17 is approximately equal to five; however, several prisms may be used in series and the resultant factor M would then be the product of the values of M for each prism.

As illustrated in FIG. 2A, photodetector 19 comprises three photosensitive striped areas 1,2,3. The dotted oval represents the full cross-sectional beam pattern which beam 18 makes on photodetector 19. Let $I_1, I_2, I_3$ be the electrical signals generated by the light incident on these photosensitive areas 1,2,3, respectively.

Signals $I_1$ and $I_3$ are summed and amplified at amplifier 20 to provide output signal $S_1$, whereas signal $I_2$ is amplified at amplifier 21 to provide output signal $S_2$. $S_1$ equals $S_2$ when the beam 14 is in focus. Signals $S_1$ and $S_2$ are supplied to a differential amplifier 22 and a summing amplifier 26 whose outputs are supplied to divider circuit 28. The bandwidth of amplifiers 20, 21, 22 and 26 are sufficiently in excess of the focus-servo bandwidth, (which is typically less than 10kHz), such that the phase differences between the outputs of amplifiers 22 and 26 are negligible. The output of the divider circuit 28 is the focus error signal, FES.

$$FES = \frac{S_1 - S_2}{S_1 + S_2} \quad (4)$$

The focus error signal is applied to a focus servo control system 23 (FIG. 1). As illustrated, system 23 comprises conventional means, such as a voice coil driver, for adjusting the current in a coil 24 of a voice coil motor and thereby adjusting the position of lens 15 relative to surface 16. A typical servo system is shown in European patent application EP0164687.

In a diffraction-limited optical system the intensity profile of beam 18 will be Gaussian, that is:

$$-8x^2/W^2 \quad (5)$$

The width 2a of area 2 of detector 19 is chosen such that when disk surface 16 is at the focus of lens 15, one half of the light incident on detector 19 falls on area 2, and the other half falls on areas 1 and 3.

The total power P in beam 18 is given by:

$$P = \int_{-\infty}^{\infty} I_0 e^{-8x^2/W^2} \, dx = \frac{\sqrt{2\pi}}{4} W I_0 \quad (6)$$

and the power on area 2 of detector 19 is:

$$P_2 = \int_{-a}^{a} I_0 e^{-8x^2/W^2} dx \quad (7)$$

which, when $\delta z = 0$ and $W = A$, is equal to P/2 when $a = 0.169A$.

In order to evaluate the sensitivity of the FES to changes in the focus position dz of lens 15, we need to find the relative change of $S_2$ with dz. Since $S_2$ is proportional to $I_2$ and $I_2$ is proportional to $P_2$, the quantity of interest is:

$$\frac{1}{P_2} \frac{dP_2}{dz} = \frac{1}{P_2} \frac{dP_2}{dW} \frac{dW}{dz}$$

Using equations (3) and (7)

$$\frac{1}{P_2} \frac{dP_2}{dz} = \frac{2}{P} \frac{d}{dW}\left[ \frac{4P}{\sqrt{2\pi}\, W} \int_{-a}^{a} e^{-8x^2/W^2} dx \right] \frac{2lM^2A}{f^2}$$

$$= \frac{16lM^2A}{\sqrt{2\pi}\, f^2} \frac{d}{dW}\left[ \frac{1}{W} \int_{-a}^{a} e^{-8x^2/W^2} dx \right]$$

the derivative is evaluated as:

$$= \frac{1}{W} \int_{-a}^{a} \frac{d}{dW}(e^{-8x^2/W^2}) dx - \frac{1}{W^2} \int_{-a}^{a} e^{-8x^2/W^2} dx$$

$$= \frac{1}{W} \int_{-a}^{a} \frac{16x^2}{W^3} e^{-8x^2/W^2} dx - \frac{1}{W^2} \int_{-a}^{a} e^{-8x^2/W^2} dx$$

$$= \frac{1}{W^2} \int_{-a}^{a} -x \frac{d}{dx}(e^{-8x^2/W^2}) dx - \frac{1}{W^2} \int_{-a}^{a} (e^{-8x^2/W^2}) dx$$

$$= \frac{1}{W^2} [-x\, e^{-8x^2/W^2}]_{-a}^{a}$$

$$= -\frac{2a}{W^2} e^{-8a^2/W^2}$$

When $\delta z = 0$, $a = 0.169A$, and $W = A$, the above quantity is equal to $-0.269/A$. Thus $$\frac{1}{P_2} \frac{dP_2}{dz} = \frac{-16lM^2}{\sqrt{2\pi}\, f^2} (0.269) = \frac{-1.72lM^2}{f^2}$$

For typical values of l(50 mm) and f(4 mm) and with no prism (M=1) as in the prior art (see Yamamoto, et al.), this quantity is equal to 5.4/mm. A large focus error $\delta z$ of 0.001 mm would create a change in $P_2$, and hence in $S_2$, of only 0.54%. Since the change in $S_1$ is equal and opposite to that of $S_2$, it follows from equation (4) that the FES, which has a range of ±1, would be only 0.0108.

Incorporating a prism with M=5 according to the principles of this invention would increase the FES to 0.264, an increase by a factor of 25 in the sensitivity of the focus servo loop.

The preferred configuration of the photodetector is shown in FIG. 2B. Photodetector 25 includes six photosensitive areas 1-6 for generating electrical signals $I_1 - I_6$, respectively. The focus error signal is given by $$FES = \frac{S_1 - S_2}{S_1 + S_2}$$

and the track error signal by $$TES = \frac{S_3 - S_4}{S_3 + S_4}$$

where $$S_1 = k(I_1 + I_3 + I_4 + I_6)$$
$$S_2 = k(I_2 + I_5)$$
$$S_3 = k(I_1 + I_2 + I_3)$$
$$S_4 = k(I_4 + I_5 + I_6)$$

where k is the gain of amplifiers 20 and 21.

The manner in which the track error signal is used to adjust track error is conventional and forms no part of the present invention. FIG. 2B is included merely to show that applicants' method and means for detecting and correcting focus errors is compatible with and desirably used in conjunction with a photodetector like photodetector 25 that generates both focus error and track error signals.

FIG. 3

As illustrated in FIG. 3, the invention according to this embodiment comprises an optical head especially suitable for use with read-only, write-once or phase-change optical disks. A laser 30 emits a beam that is collimated by a lens 32 and circularized by refraction at surface 34 of a prism 46. Surface 34 has a polarizing beam splitter (PBS) coating. The beam 35 is directed through a quarter-wave plate 36 to a beam bender 38 and a lens 40 that focuses said beam onto a selectable track on an optical disk 42. The beam 35' reflected from disk 42 returns through the wave plate 36 and is reflected as beam 37 from surface 34 toward surface 44 of prism 46. Refraction of beam 37 at surface 44 reduces the width of said beam by a factor of M from D to A and directs this elliptical beam 47 to a photodetector 48 that preferably is segmented as shown in FIG. 2A or 2B. The full unobstructed cross-sectional beam pattern of beam 47 falls on photodetector 48.

If, as illustrated in FIG. 3, the disk 42 is in focus, then the return beam 35' will coincide with the beam 35, and the beam width at the photodetector 48 will be equal to A. If, however, disk 42 is out of focus, then the return beam 35' will diverge or converge from the beam 35, and cause the width of the beam to the photodetector 48 to be greater or smaller than A. This effect is analogous to the divergence of beam 18' as shown in FIG. 1. Photodetector 48 is connected to circuitry similar to that shown in FIG. 2A and a FES is generated. The position of lens 40 relative to the surface of the disk 42 is adjusted in response to this FES by suitable servo means similar to that shown in FIG. 1 as necessary to put the disk in focus.

FIG. 4

FIGS. 4A and 4B illustrate another embodiment of an optical head for use with read-only, write-once or phase-change disks. According to this embodiment, the general orientation of the head is parallel to the tracks on a disk 50. This head is therefore most easily adapted to a disk drive that employs a swing-arm actuator. A laser 52 (FIG. 4A) emits a beam that is collimated by a lens 54 and directed to and through a PBS 56 without deflection or reflection. Beam 58 from PBS 56 is elliptical in cross section, with a width D in one dimension and a width A in a direction orthogonal thereto. This beam 58 passes through a quarter-wave plate 60 and is directed to a prism assembly 62. At a first surface 64 of prism assembly 62, beam 58 is circularized, then reflected by total internal reflection (TIR) from another surface 66 to and off a reflective surface 68 to an objective lens 70 that focuses the resultant beam 72 onto the disk 50. Beam 72 is reflected from the disk as reflected beam 58'. In this embodiment, refraction at surface 64 accomplishes the two functions of circularizing the beam 58 going to the disk and enhancing the focus error signal. Beam 58', which again is elliptical in cross section, is reflected by a surface 74 of the PBS 56 and directed to a photodetector 76 that preferably is segmented as shown in FIG. 2A or 2B. The full unobstructed beam pattern of beam 58' falls on photodetector 76.

If, as illustrated in FIG. 4, the disk 50 is in focus, then the return beam 58' will coincide with the beam 58, and the beam width at the photodetector 76 will be equal to A. If, however, the data on disk 50 is out of focus, then the return beam 58' will diverge from the beam 58, and cause the width of the beam to the photodetector 76 to be greater than A. This effect is analogous to the divergence of beam 18' as shown in FIG. 1. Photodetector 76 is connected to circuitry similar to that shown in FIG. 2A and a FES is generated. The position of lens 70 relative to the surface of the disk 50 is adjusted in response to this FES by suitable servo means similar to that shown in FIG. 1 as necessary to put the disk in focus.

This embodiment requires that the expansion/compression ratio M of prism assembly 62 must be matched to the emission pattern of laser 52.

FIG. 5

Figure 5:
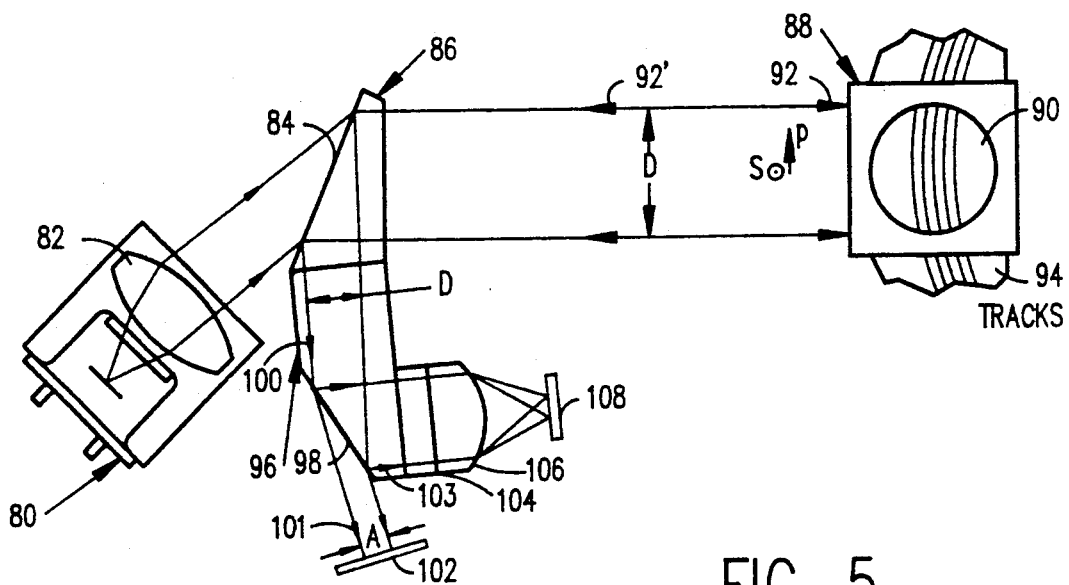
FIG. 5 illustrates an embodiment for use with magneto-optic disks.

FIG. 5 illustrates still another embodiment of an optical head for use with magneto-optic disks. A laser 80 emits a beam that is collimated by a lens 82, circularized by refraction at surface 84 of a prism 86 and directed towards a beam bender 88 and an objective lens 90. Surface 84 is a partially polarizing beam splitter surface that directs a fraction of the p-polarized component of beam 92' as reflected from a selected track on disk 94, and substantially all of the s-polarized component of said beam to surface 98 of a prism 96 as a beam 100. Surface 98 is also a partially-polarizing beam splitter surface. Surface 98 refracts a fraction of the p-polarized component of beam 100 as a beam 101 to a servo photodetector 102 preferably segmented as shown in FIG. 2A or 2B. The full cross-sectional beam pattern of beam 101 falls on photodetector 102. This refraction at surface 98 causes a reduction in one dimension of beam 100 by a factor of M and concurrently increases the divergence/convergence angle associated with said beam by the factor M in said dimension. Surface 98 also directs a fraction of the p-polarized component of beam 100 as well as substantially all of the s-polarized component of beam 100 as a beam 103 to a Wollaston prism 104, converging lens 106 and data detector 108. The function of the Wollaston prism in detecting the data on a magneto-optic disk is well known in the art and does not form part of the present invention.

If, as illustrated in FIG. 5, the disk 94 is in focus, then the return beam 92' will coincide with the primary beam 92, and the beam width at the photodetector 102 will be equal to A. If, however, the disk 94 is out of focus, then the return beam 92' will diverge from the beam 92, and cause the width of the beam to the photodetector 102 to be greater than A. This effect is analogous to the divergence of beam 18' as shown in FIG. 1. Photodetector 102 is connected to circuitry similar to that shown in FIG. 2A and a FES is generated. The position of lens 90 relative to the surface of the disk 94 is adjusted in response to this FES by suitable servo means similar to that shown in FIG. 1 as necessary to put the disk in focus.

It will now be seen that, in each of the configurations shown in FIGS. 3–5, unlike those taught by the prior art, the focus error signal is desirably enhanced by a factor of $M^2$.

While the invention has been shown and described with reference to preferred embodiments thereof, it will be understood by those skilled in the art that various changes in form and details may be made without departing from the spirit and scope of the invention, and the invention is therefore not to be limited except as defined in the claims.

What is claimed is:

1. An apparatus for detecting a focus-error in an optical head adapted to read and/or write data on an optical recording medium, comprising:
   a light source for providing a primary light beam to said medium;
   a prism positioned in an optical path of a return light beam reflected from said medium for reducing said return light beam in one dimension by a factor of M and concurrently increasing the divergence/convergence angle of said return light beam by a factor of M in said dimension, whereby a change in said dimension of said return light beam indicative of said focus-error of said head is enhanced by a factor of $M^2$;
   a photodetector located in said optical path for receiving an unobstructed return light beam from the prism, the photodetector having a first, second and third photosensitive areas located proximate one another along said dimension of said return beam; and
   a circuit connected to the photodetector for comparing the sum of the amount of light at said first and third areas with the amount of light at the second area and generating a focus-error signal responsive thereto.

2. The apparatus of claim 1, wherein said second photosensitive area is centered between the first and third photosensitive areas such that the focus-error signal generated is zero when the sum of the amount of light at the first and third photosensitive areas equals the amount of light at the second photosensitive area.

3. The apparatus of claim 2, wherein said second photosensitive area is in the form of a strip between said first and third photosensitive areas and said first, second and third areas are further divided in a direction perpendicular to the stripe to create three upper and three lower photosensitive areas.

4. The apparatus of claim 1, further including:
   a focus lens located in the optical path of said primary beam for directing said primary beam onto said medium; and
   servo means connected to the photodetector and the focus lens for adjusting the focus lens relative to the medium responsive to said focus-error signal.

5. An apparatus for detecting a focus-error in an optical head adapted to read and/or write data on an optical recording medium, comprising:
   a light generation means for providing a primary beam of collimated light;
   a prism having one surface for circularizing said primary beam;
   a quarter-wave plate for receiving said primary beam from said prism;
   a lens for focusing said primary beam from the quarter-wave plate onto said medium;
   said prism being positioned in the optical path of a return light beam reflected from the medium for reducing said return light beam in one dimension by a factor M and concurrently increasing the divergence/convergence angle of said return light beam by a factor of M in said dimension, whereby a change in said dimension of said return light beam indicative of said focus-error of said head is enhanced by a factor $M^2$;
   a photodetector located in said optical path for receiving an unobstructed return light beam from the prism, the photodetector having a first, second and third photosensitive areas located proximate one another along said dimension of said return beam; and
   a circuit connected to the photodetector for comparing the sum of the amount of light at the first and third areas with the amount of light at the second area and generating a focus-error signal responsive thereto.

6. An apparatus for detecting a focus-error in an optical head adapted to read and/or write data on an optical recording medium, comprising:
   a light generation means for providing a primary beam of collimated light;
   a quarter-wave plate for receiving said primary beam;
   a prism having one surface for circularizing the primary beam from the quarter-wave plate, a second surface from which the circularized light is reflected by total internal reflection, and a third surface which is reflective;
   a lens for focussing the beam reflected from said third surface onto the medium;
   said prism being positioned in the optical path of a return light beam reflected from the medium for reducing said return light beam in one dimension by a factor of M and concurrently increasing the divergence/convergence angle of said return light beam by a factor of M in said dimension, whereby a change in said dimension of said return light beam indicative of said focus-error of said head is enhanced by a factor of $M^2$;
   a polarizing beamsplitter for receiving said return light beam from said prism;
   a photodetector located in said optical path for receiving an unobstructed return light beam from the prism, the photodetector having a first, second and third photosensitive areas located proximate one another along said dimension of said return beam; and
   a circuit connected to the photodetector for comparing the sum of the amount of light at the first and third areas with the amount of light at the second area and generating a focus-error signal responsive thereto.

7. A method for detecting a focus-error in an optical head to which a light beam is directed for reading and/or writing data on an optical recording medium, the steps comprising:

positioning a prism in an optical path of a return light beam reflected from said medium for reducing said return light beam in one dimension by a factor of M and concurrently increasing the divergence/convergence angle of said return light beam by a factor of M in said dimension, whereby a change in said dimension of said return light beam indicative of said focus-error of said head is enhanced by a factor $M^2$;

providing a photodetector located in said optical path for receiving an unobstructed return light beam from the prism, the photodetector having a first, second and third photosensitive areas located proximate one another along said dimension of said return light beam; and comparing the sum of the amount of light at the first and third photosensitive areas with the amount of light at the second photosensitive area and generating a focus-error signal responsive thereto.

8. The method of claim 7, wherein said second photosensitive area is centered between the first and third photosensitive areas such that the focus-error signal generated is zero when the sum of the amount of light at the first and third photosensitive areas equals the amount of light at the second photosensitive area.

9. The method of claim 8, wherein said second photosensitive area is in the form of a strip between said first and third photosensitive areas and said first, second and third areas are further divided in a direction perpendicular to the stripe to create three upper and three lower photosensitive areas.

10. The method of claim 7, further including the step of adjusting the position of a focussing lens within the optical path in response to said focus-error signal as necessary to cause the sum of the amount of light at the first and third photosensitive areas to equal the amount of light at the second photosensitive area.

11. An apparatus for detecting a focus-error in an optical head adapted to read and/or write data on an optical recording medium, comprising:

a light generation means for providing a primary beam of collimated light;

a first prism for circularizing said primary beam by refraction;

a lens for focussing said primary beam from the first prism on to the medium;

a second prism;

said first prism being positioned in the optical path of a return light beam reflected from the medium, the first prism having a partially polarizing beamsplitter surface for directing a fraction of a p-polarized component of said return beam and substantially all of a s-polarized component of said return light beam to the second prism;

said second prism having a partially polarizing beamsplitter surface for refracting a fraction of the p-polarized component of said return light beam from the first prism, and said second prism reducing said return light beam in one dimension by a factor of M and concurrently increasing the divergence/convergence angle of said return light beam by a factor M in said dimension, whereby a change in said dimension of said return light beam indicative of said focus-error of said head is enhanced by a factor of $M^2$;

a photodetector located in said optical path for receiving an unobstructed return light beam from the second prism, the photodetector having a first, second and third photosensitive areas located proximate one another along said dimension of said return beam; and a circuit connected to the photodetector for comparing the sum of the amount of light at the first and third photosensitive areas with the amount of light at the second photosensitive area and generating a focus-error signal responsive thereto.

* * * * *

UNITED STATES PATENT AND TRADEMARK OFFICE
CERTIFICATE OF CORRECTION

PATENT NO. : 5,084,783
DATED : January 28, 1992
INVENTOR(S) : Dewey, et al.

It is certified that error appears in the above-identified patent and that said Letters Patent is hereby corrected as shown below:

In the Claims

CLAIM 3, Column 7, Line 60, replace "strip" with --stripe--.

CLAIM 9, Column 9, Line 34, replace "strip" with --stripe--.

Signed and Sealed this

First Day of June, 1993

Attest:

MICHAEL K. KIRK

Attesting Officer     Acting Commissioner of Patents and Trademarks